United States Patent
Wang et al.

(10) Patent No.: US 10,560,871 B2
(45) Date of Patent: Feb. 11, 2020

(54) OPERATION PROCESSING METHOD AND DEVICE

(71) Applicant: Huawei Technologies Co., Ltd., Shenzhen (CN)

(72) Inventors: Yahui Wang, Beijing (CN); Wenmei Gao, Beijing (CN); Chao Qin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/577,149

(22) PCT Filed: May 29, 2015

(86) PCT No.: PCT/CN2015/080394
§ 371 (c)(1),
(2) Date: Nov. 27, 2017

(87) PCT Pub. No.: WO2016/191977
PCT Pub. Date: Dec. 8, 2016

(65) Prior Publication Data
US 2018/0184329 A1    Jun. 28, 2018

(51) Int. Cl.
*H04W 28/10*    (2009.01)
*H04W 24/08*    (2009.01)
*H04W 88/02*    (2009.01)

(52) U.S. Cl.
CPC .......... *H04W 28/10* (2013.01); *H04W 24/08* (2013.01); *H04W 88/02* (2013.01)

(58) Field of Classification Search
CPC ... H04L 12/14; H04L 12/1403; H04L 12/141; H04L 12/1421; H04L 51/08; H04L 51/10;
(Continued)

(56) References Cited

U.S. PATENT DOCUMENTS 9,479,519 B1 * 10/2016 Hill .................. H04L 43/04
2004/0103143 A1    5/2004 Chikada et al.
(Continued)

FOREIGN PATENT DOCUMENTS

CN    101222521 A    7/2008
CN    101815124 A    8/2010
(Continued)

OTHER PUBLICATIONS

Foreign Communication From a Counterpart Application, European Application No. 15893640.1, Extended European Search Report dated Mar. 14, 2018, 7 pages.
(Continued)

Primary Examiner — Kan Yuen
(74) Attorney, Agent, or Firm — Conley Rose, P.C.

(57) ABSTRACT

A method includes detecting a first operation, where the first operation is used to trigger sending an object on an application program, and the object includes a video file, an audio file, a picture, or a page that contains a link; in response to the first operation, determining a traffic value for loading the object, and displaying the traffic value in an input box of a to-be-sent screen; detecting a second operation, where the second operation is used to determine to send the object and information that includes at least the traffic value; and in response to the second operation, sending the object and the information that includes at least the traffic value.

7 Claims, 8 Drawing Sheets

(58) Field of Classification Search
CPC ....... H04L 67/04; H04M 15/00; H04M 15/58; H04M 15/8214; H04M 15/83; H04M 15/85; H04M 15/851; H04M 15/853; H04M 15/854; H04M 2215/82; H04W 24/08; H04W 28/10; H04W 4/24; H04W 88/02
See application file for complete search history.

(56) References Cited

U.S. PATENT DOCUMENTS

| | | | |
|---|---|---|---|
| 2007/0037563 A1* | 2/2007 | Yang | H04L 67/104 455/418 |
| 2011/0167337 A1* | 7/2011 | Paley | H04L 67/06 715/252 |
| 2012/0110596 A1 | 5/2012 | Zhou | |
| 2013/0173634 A1* | 7/2013 | Shaban Hussein | G06F 16/176 707/748 |
| 2016/0335354 A1* | 11/2016 | Rama | G06F 16/9535 |

FOREIGN PATENT DOCUMENTS

| | | |
|---|---|---|
| CN | 101894141 A | 11/2010 |
| CN | 102457613 A | 5/2012 |
| CN | 104484259 A | 4/2015 |
| CN | 104540150 A | 4/2015 |
| JP | 2012074867 A | 4/2012 |

OTHER PUBLICATIONS

Machine Translation and Abstract of Chinese Publication No. CN101815124, Aug. 25, 2010, 9 pages.
Machine Translation and Abstract of Chinese Publication No. CN102457613, May 16, 2012, 32 pages.
Machine Translation and Abstract of Chinese Publication No. CN104484259, Apr. 1, 2015, 38 pages.
Machine Translation and Abstract of Chinese Publication No. CN104540150, Apr. 22, 2015, 14 pages.
Machine Translation and Abstract of Japanese Publication No. JP2012074867, Apr. 12, 2012, 19 pages.
Fielding, R., et al., "Hypertext Transfer Protocol—HTTP/1.1," RFC 2616, Jun. 1999, 114 pages.
Belshe, M., et al., "Hypertext Transfer Protocol Version 2 (HTTP/2)," RFC 7540, May 2015, 96 pages.
Foreign Communication From a Counterpart Application, PCT Application No. PCT/CN2015/080394, English Translation of International Search Report dated Feb. 26, 2016, 2 pages.
Foreign Communication From a Counterpart Application, PCT Application No. PCT/CN2015/080394, English Translation of Written Opinion dated Feb. 26, 2016, 5 pages.
Machine Translation and Abstract of Chinese Publication No. CN101222521, Jul. 16, 2008, 8 pages.
Foreign Communication From a Counterpart Application, Chinese Application No. 201580017752.1, Chinese Office Action dated Nov. 21, 2019, 6 pages.

* cited by examiner

OPERATION PROCESSING METHOD AND DEVICE

CROSS-REFERENCE TO RELATED APPLICATIONS

This application is a national stage of International Application No. PCT/CN2015/080394, filed May 29, 2015, which is hereby incorporated by reference in its entirety.

TECHNICAL FIELD

This application relates to the field of electronic technologies, and in particular, to an operation processing method and device.

BACKGROUND

With development of communications technologies, a user spends more time using a data network and uses the data network on more occasions. For example, the user usually browses information on a social application, such as Weibo. Generally, some of the information is a link shared by another user or a subscription account. Therefore, to view the shared content, the user needs to click the link to enter a web page or an application screen.

However, on the web page or the application screen, sometimes a large quantity of pictures may exist, sometimes a video may play automatically, and sometimes an application may be downloaded automatically. Therefore, when the user opens the web page or the application screen, considerable resources need to be consumed, such as data traffic and electricity.

Therefore, in some approaches, when a portable electronic device sends a request for browsing a web page, the portable electronic device sends an entered website to a network device, such as a server. After receiving the website sent by the portable electronic device, the network device computes data traffic corresponding to the web page according to the website, and then sends the data traffic of the web page to the portable electronic device. The portable electronic device compares the data traffic of the web page with a preset threshold, and if the data traffic of the web page is greater than the threshold, the user is reminded that the data traffic of the web page exceeds the preset threshold. However, in this method, the data traffic for loading the web page can only be obtained with the help of the network device.

SUMMARY

Embodiments of this application provide an operation processing method and device, to resolve a problem that a traffic reminder cannot be obtained without the help of a network device.

According to a first aspect, an operation processing method is provided, applied to a portable electronic device that includes a display and multiple application programs, where the method includes detecting a first operation, where the first operation is used to trigger sending an object on an application program, and the object includes a video file, an audio file, a picture, or a page that contains a link; in response to the first operation, determining a traffic value for loading the object, and displaying the traffic value in an input box of a to-be-sent screen; detecting a second operation, where the second operation is used to determine to send the object and information that includes at least the traffic value; and in response to the second operation, sending the object and the information that includes at least the traffic value.

With reference to the first aspect, in a first possible implementation manner of the first aspect, before the detecting a first operation, the method further includes obtaining and storing a traffic value used for loading the object.

With reference to the first possible implementation manner of the first aspect, in a second possible implementation manner of the first aspect, the obtaining and storing a traffic value used for loading the object includes enabling traffic statistics collection when the object is opened; when the object is completely loaded, ending traffic statistics collection and obtaining the used traffic value; and storing the obtained traffic value.

With reference to the second possible implementation manner of the first aspect, in a third possible implementation manner of the first aspect, before the enabling traffic statistics collection, the method further includes determining that the object is sent by another portable electronic device; and determining that when sending the object, the another portable electronic device does not send the traffic value for loading the object.

With reference to the first possible implementation manner of the first aspect, in a fourth possible implementation manner of the first aspect, the obtaining and storing a traffic value used for loading the object includes determining that the object is sent by another portable electronic device; determining that when sending the object, the another portable electronic device sends the traffic value for loading the object; obtaining the traffic value sent by the another portable electronic device, and using the obtained traffic value as the traffic value used for loading the object; and storing the traffic value.

With reference to the fourth possible implementation manner of the first aspect, in a fifth possible implementation manner of the first aspect, the determining that when sending the object, the another portable electronic device sends the traffic value for loading the object includes detecting whether a display area of the object includes a traffic unit; and if the display area of the object includes a traffic unit, determining that the another portable electronic device has sent the traffic value for loading the object; and the obtaining the traffic value sent by the another portable electronic device, and using the obtained traffic value as the traffic value used for loading the object includes obtaining the traffic unit and a numeric string preceding the traffic unit, and using the traffic unit and the numeric string as the traffic value used for loading the object.

With reference to the first aspect, or any one of the first possible implementation manner of the first aspect to the fifth possible implementation manner of the first aspect, in a sixth possible implementation manner of the first aspect, when the object is one of a picture, an audio file, or a video file, the determining a traffic value for loading the object includes obtaining a traffic value consumed for uploading the object to the to-be-sent screen, and using the traffic value as the traffic value for loading the object.

With reference to the first aspect, or any one of the first possible implementation manner of the first aspect to the fifth possible implementation manner of the first aspect, in a seventh possible implementation manner of the first aspect, when the object is a page that contains a link, and a code segment of the page includes a traffic value, the determining a traffic value for loading the object includes obtaining the traffic value in the code segment of the page, and using the traffic value as the traffic value for loading the page.

According to a second aspect, a portable electronic device is provided, including a detection unit configured to detect a first operation, where the first operation is used to trigger sending an object on an application program, and the object includes a video file, an audio file, a picture, or a page that contains a link; and a processing unit configured to in response to the first operation, determine a traffic value for loading the object, and display the traffic value in an input box of a to-be-sent screen; where the detection unit is further configured to detect a second operation, where the second operation is used to determine to send the object and information that includes at least the traffic value; and the processing unit is further configured to in response to the second operation, send the object and the information that includes at least the traffic value.

With reference to the second aspect, in a first possible implementation manner of the second aspect, the processing unit is further configured to before the detection unit detects the first operation, obtain and store a traffic value used for loading the object.

With reference to the first possible implementation manner of the second aspect, in a second possible implementation manner of the second aspect, the processing unit is further configured to enable traffic statistics collection when the object is opened; when the object is completely loaded, end traffic statistics collection and obtain the used traffic value; and store the obtained traffic value.

With reference to the second possible implementation manner of the second aspect, in a third possible implementation manner of the second aspect, the processing unit is further configured to before enabling traffic statistics collection, determine that the object is sent by another portable electronic device; and determine that when sending the object, the another portable electronic device does not send the traffic value for loading the object.

With reference to the first possible implementation manner of the second aspect, in a fourth possible implementation manner of the second aspect, the processing unit is further configured to determine that the object is sent by another portable electronic device; determine that when sending the object, the another portable electronic device sends the traffic value for loading the object; obtain the traffic value sent by the another portable electronic device, and use the obtained traffic value as the traffic value used for loading the object; and store the traffic value.

With reference to the fourth possible implementation manner of the second aspect, in a fifth possible implementation manner of the second aspect, the processing unit is further configured to determine whether a display area of the object includes a traffic unit; if the display area of the object includes a traffic unit, determine that the another portable electronic device has sent the traffic value for loading the object; and obtain the traffic unit and a numeric string preceding the traffic unit, and use the traffic unit and the numeric string as the traffic value used for loading the object.

With reference to any one of the second aspect or the first possible implementation manner of the second aspect to the fifth possible implementation manner of the second aspect, in a sixth possible implementation manner of the second aspect, the processing unit is further configured to when the object is one of a picture, an audio file, or a video file, obtain a traffic value consumed for uploading the object to the to-be-sent screen, and use the traffic value as the traffic value for loading the object.

With reference to any one of the second aspect or the first possible implementation manner of the second aspect to the fifth possible implementation manner of the second aspect, in a sixth possible implementation manner of the second aspect, the processing unit is further configured to when the object is a page that contains a link, and a code segment of the page includes a traffic value, obtain the traffic value in the code segment of the page, and use the traffic value as the traffic value for loading the page.

According to a third aspect, a portable electronic device is provided, including a display, one or more processors, a memory, at least one application program, and one or more programs, where the one or more programs are stored in the memory and are configured for execution by the one or more processors, and the one or more programs include an instruction used to execute the method according to any possible implementation manner of the first aspect to the seventh possible implementation manner of the first aspect.

According to a fourth aspect, a computer readable storage medium is provided configured to store one or more program codes, where the one or more program codes include an instruction, and when executed by a portable electronic device that includes a display and multiple application programs, the instruction enables the portable electronic device to execute the method according to any possible implementation manner of the first aspect to the seventh possible implementation manner of the first aspect.

When an object is being sent, a traffic value for loading the object is obtained, display the traffic value in an input box of a to-be-sent screen, and then the traffic value for loading the object is sent together with the object. It can be learned that, in the embodiments of the present disclosure, the traffic value is sent together with the object, so that when a receiver receives the object, the receiver can also receive the traffic value for loading the object at the same time. Therefore, a user can conveniently know the traffic value for loading the object, and then determine, based on the traffic value, whether to open the object. Compared with some approaches in which whether to open a link can be determined only after a network device pre-computes and delivers data traffic of a web page, in the method of the embodiments of the present disclosure, the receiver can still obtain a traffic reminder even without the help of the network device.

Further, in the method of the embodiments of this application, an intervention of the network device is avoided. Therefore, the network device can omit this part of work, thereby reducing a data processing amount.

DESCRIPTION OF EMBODIMENTS

In the embodiments of the present disclosure, when an object is being sent, a traffic value for loading the object is obtained, and the traffic value is sent together with the object, so that a receiver can know the traffic value for loading the object. Therefore, the receiver can still know the traffic value for loading the object even without the help of a network device.

Further, the traffic value may be directly displayed in a display area that is formed after the object is sent. When seeing the display area, a user can intuitively see the traffic value. Therefore, the user can conveniently know how much traffic is to be consumed for opening the object, thereby making it easy for the user to determine whether to open the object.

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are a part rather than all of the embodiments of this application. All other embodiments obtained by a person of ordinary skill in the art based on the embodiments of this application without creative efforts shall fall within the protection scope of this application.

Figure 1:
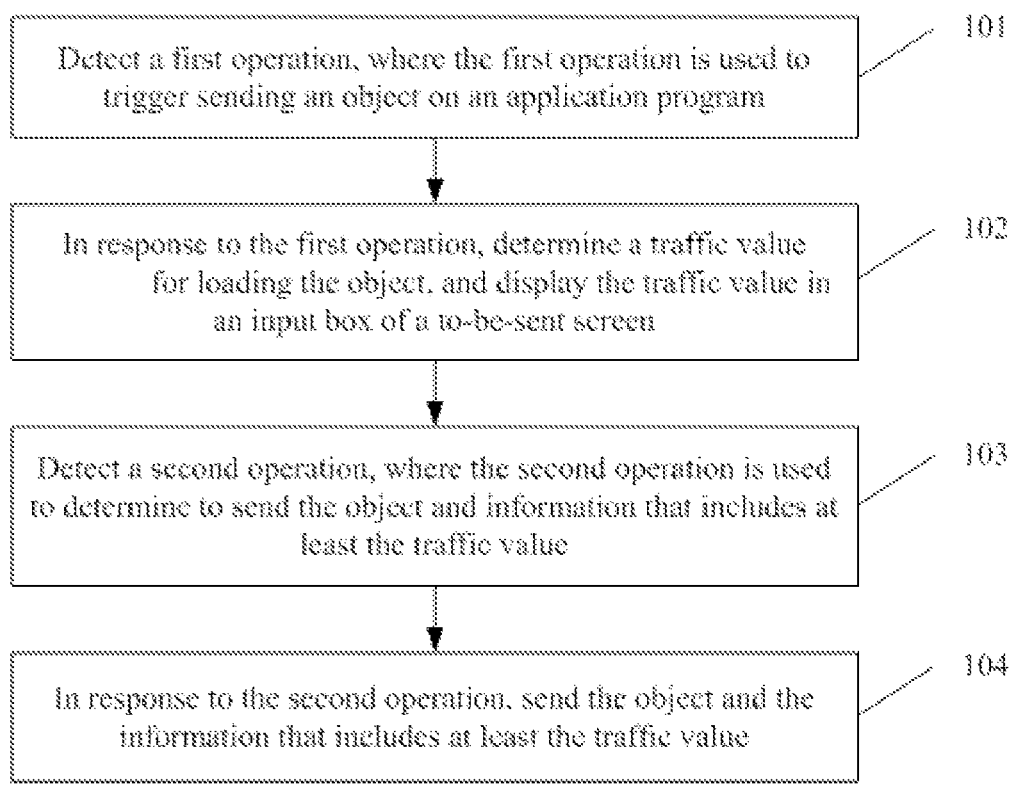
FIG. 1 is a flowchart of an operation processing method according to an embodiment of this application.

Referring to FIG. 1, FIG. 1 is a flowchart of an operation processing method according to an embodiment of this application. The method may be applied to a portable electronic device such as a mobile phone, a tablet computer, a laptop computer, and a desktop computer. The portable electronic device includes a display and multiple application programs. The multiple application programs may include an application on which an object can be sent, such as Weibo, WeChat, and Twitter.

As shown in FIG. 1, steps 101 to 104 are executed by the portable electronic device, and the method includes the following steps.

Step 101, detect a first operation, where the first operation is used to trigger sending an object on an application program, and the object includes a video file, an audio file, a picture, or a page that contains a link.

It should be understood that, "sending an object" herein may be understood as forwarding an object to a friend, forwarding an object to a group, sharing an object with a circle of friends, sharing an object in Qzone, or the like. That is, "send" in this specification may be understood as forward, share, group sending, post, or the like.

Step 102, in response to the first operation, determine a traffic value for loading the object, and display the traffic value in an input box of a to-be-sent screen.

Step 103, detect a second operation, where the second operation is used to determine to send the object and information that includes at least the traffic value.

Step 104, in response to the second operation, send the object and the information that includes at least the traffic value.

In a practical usage scenario, after opening a page, a user browses content on the page. If the user considers that the content on the page is good, the user may further want to share the page with others. Therefore, the user may share the page by using an application such as WeChat Moments or Weibo. Alternatively, the user shoots a picture or a video and wants to share it with a circle of friends or send it to a friend. Therefore, the object in this embodiment of the present disclosure may be a web page, a third-party application screen, an online audio, an online video, a local audio, a local video, a static picture, or a dynamic animation. Therefore, the object may include a video file, an audio file, a picture, or a page that contains a link.

For example, an object used for forwarding may be a Weibo post, a WeChat message, or an SMS message. Certainly, in practical application, the object may be in another form, provided that the object can be sent by using an application such as WeChat Moments or Weibo.

It should be noted that "send" in step 101 includes sending the object to an individual or a group, also includes sharing the object with a circle of friends, or may include sharing the object in a group or a zone of another application.

For example, if the user clicks a share button on a screen of WeChat Moments or Weibo, and chooses to share a page, the portable electronic device detects an operation used for sharing the page. For another example, if the user chooses a share operation in operation items of a page, and determines that a target application for sharing the page is WeChat Moments or Weibo, in this case, the portable electronic device detects an operation used for sharing the page. For still another example, if the user sees, on the Weibo application, a post about a collection of photos posted by a friend, and clicks a forward button, in this case, the portable electronic device detects an operation used for forwarding the Weibo post.

When the first operation used to trigger sending an object on an application program is detected, step 102 is performed in response to the first operation, that is, the traffic value for loading the object is determined, and the traffic value is displayed in the input box of the to-be-sent screen. In practical application, according to different types of objects, there may be multiple implementation manners of determining a traffic value for loading the object. Even for a same object, there may be multiple implementation manners of determining a traffic value for loading the object, and detailed descriptions are as follows.

In a first possible implementation manner, the determining a traffic value for loading the object includes obtaining a stored traffic value that is corresponding to the sending. Before step 101, the method further includes obtaining and storing a traffic value used for loading the object.

Cases are classified based on whether the portable electronic device counts the traffic value locally. In a first case, the portable electronic device counts the traffic value locally. The obtaining and storing a traffic value used for loading the object includes enabling traffic statistics collection when the object is opened; when the object is completely loaded, ending traffic statistics collection and obtaining the used traffic value; and storing the obtained traffic value.

For example, opening the object is opening a page by using an address link; or opening a picture, a video, or a dynamic picture sent by another portable electronic device.

There are many cases of opening a page by using an address link. For example, when the user enters a website in an address bar of a browser and then clicks a "Go" button, in this case, a page is opened by using the address link. For another example, when the user clicks a link received from a friend by using WeChat, an SMS message, or a Weibo private message, a page is opened by using the address link. For still another example, when the user clicks a link sent by using WeChat Moments or Weibo, a page is opened by using the address link.

The page may be a web page, or may be a screen of a third-party application.

In addition, the opening a picture, a video, or a dynamic picture, for example, may be clicking, by the user, an image thumbnail sent by a friend in Moments, or clicking a video file uploaded by another user, or clicking a dynamic picture.

Traffic statistics collection is enabled when an object is opened in the foregoing manner or another manner, and when the object is completely loaded, traffic statistics collection ends, and a used traffic value is obtained.

An Android operating system is used as an example. The Android operating system provides an application programming interface (API) for traffic monitoring. A process identification of each application program in the operating system can be obtained by using the API, so that traffic consumed by the application program can be obtained. Therefore, in this embodiment of the present disclosure, for a process identification of an application program, an event triggered when the application program opens/loads/closes a page is further detected, so that traffic consumed by the application program when a page is browsed can be locked. When a page is opened, an onclick event is triggered, and traffic statistics collection is enabled. That is, when an address link is opened, traffic consumed in a process of loading a current page starts to be counted. An onload event is triggered after the page is completely loaded, traffic statistics collection ends, and a counted traffic value is obtained. In practical application, if another operating system is used, events similar to the onclick event and the onload event can be used.

Certainly, in specific implementation, traffic statistics collection may be triggered without a need to use a trigger event of an operating system, but when it is detected that the portable electronic device is opening a page, a traffic statistics collection module is directly triggered to perform traffic statistics collection until the page is completely loaded.

In a second case, for Hypertext Transfer Protocol (HTTP) version 1.1, one HTTP request is corresponding to one Transmission Control Protocol (TCP) connection. One TCP connection is established for each on-line application. Because different pages in WeChat are corresponding to different port numbers, traffic consumed when an application program is loading a page can be determined by combining a uniform resource locator (URL) and a port number. That is, traffic used by a URL of the page and a corresponding TCP connection can be recorded.

In a third case, in HTTP protocol version 2.0, one TCP connection can serve multiple HTTP requests, that is, multiple pages can be simultaneously transmitted over one TCP port. Multiple HTTP streams on one port are differentiated by using a flow identifier that is newly extended in the HTTP 2.0 specification. Therefore, in this embodiment, traffic used by a flow identifier of an HTTP stream is recorded, where the HTTP stream is corresponding to a URL of an opened page.

In a fourth case, when the object is an screen of a third-party application, the obtaining and storing a traffic value used for loading the object includes when a page of the third-party application is being opened, the third-party application starts to count traffic used for loading the page until the page is completely loaded. Then, the third-party application can store the traffic value in the portable electronic device.

In a fifth case, the portable electronic device directly obtains a traffic value counted by another portable electronic device. A first possible case is as follows. When the another portable electronic device sends the object, the another portable electronic device has sent, by performing step 104, the traffic value for loading the object. Therefore, the obtaining and storing a traffic value used for loading the object includes determining that the object is sent by another portable electronic device; determining that when sending the object, the another portable electronic device sends the traffic value for loading the object; obtaining the traffic value sent by the another portable electronic device, and using the obtained traffic value as the traffic value used for loading the object; and storing the traffic value.

A regular expression may be used to perform searching in a display area that is formed after the another portable electronic device sends the object, so as to determine whether the display area includes a traffic unit such as B, KB, M, or G. If yes, it indicates that the display area includes the traffic value for loading the object. Then, a string of numbers preceding the traffic unit plus the traffic unit are obtained, that is, the traffic value. Optionally, the traffic unit may be included in a symbol such as [ ], ( ), { }, or < >. Optionally, the traffic value may be highlighted in various forms, such as italics, underline, or highlight. Further, the traffic value may exist only for a period of time, or may be deleted under a certain condition. For example, the traffic value is deleted after a reader opens the object.

It should be noted that after the object and the traffic value are sent, a part or the whole of a screen displayed in the display is a display area (for example, the display area of "one falling leaf is indicative of the coming of autumn . . . (1.2 M)" shown in FIG. 2c). The to-be-sent screen in step 102 refers to an screen on which the user can perform editing before the object is sent (shown in FIG. 2b).

A second possible case is as follows. The traffic value used for loading the object is received, where the traffic value is sent by a network device.

For example, an operator device of a data network counts a total traffic value used for loading the object, and then sends the traffic value to the portable electronic device. For charging, an operator counts traffic used by the portable electronic device each time, and the operator device only needs to send the traffic value to the portable electronic device, for example, notifies the portable electronic device of traffic usage by sending an SMS message.

Certainly, in practical application, traffic used by the portable electronic device may be counted by another network device and sent to the portable electronic device.

The first case to the fourth case and the second possible case of the fifth case are applicable to a scenario in which the another portable electronic device has sent the traffic value for loading the object and a scenario in which the another portable electronic device does not sent the traffic value for loading the object. The scenario in which the another portable electronic device has sent the traffic value for loading the object is as follows. When the object is being sent by the another portable electronic device, the another portable electronic device has sent the traffic value by performing steps 101 to 104.

In specific implementation, when an object is opened and before traffic statistics collection is enabled, it may be determined that the object is sent by the another portable electronic device; and determined that when sending the object, the another portable electronic device does not send a traffic value for loading the object. If the another portable electronic device has sent the traffic value for loading the object, the manner described in the first possible case of the fifth case may be used. Certainly, any one of the first case to the fourth case may be directly used with no determining performed, because even if the another portable electronic device has sent the traffic value for loading the page, it is possible that content on the page changes after the page is sent for more than one time. Therefore, the traffic value sent before is not correct, and a statistics result obtained by using the method according to any one of the first case to the fourth case is more correct. In addition, energy consumption is lower when the first possible case of the fifth case is used.

By using the method in the first case to the fourth case, that is, a manner of performing traffic statistics collection by the portable electronic device, the solution is easier and easy to implement because no network device needs to participate.

Further, the traffic value may be stored after the traffic value used for loading the page is obtained. A storage format may be customized according to requirements. For example, a correspondence table between a traffic value and an address link may be stored. Therefore, in step 102, the traffic value corresponding to the object may be obtained by searching the correspondence table.

Optionally, after the traffic value is obtained, the user may further be prompted with the traffic value in a manner of display or voice, and therefore the user is notified of the traffic value used for loading the object.

A second possible implementation manner is as follows. When the object is one of a picture, an audio file, or a video file, step 102 includes obtaining a traffic value consumed for uploading the object to the to-be-sent screen, and using the traffic value as the traffic value for loading the object. For example, the traffic value may be obtained by using the method according to any one of the first case to the third case in the foregoing description.

A third possible implementation manner is as follows. When the object is a page that contains a link, and a code segment of the page includes a traffic value, step 102 includes determining the traffic value in the code segment of the page as the traffic value for loading the page.

When establishing a website or developing a third-party application, a web page developer or a third-party application developer writes a traffic value for loading each page into a code segment corresponding to each page. Therefore, when the first operation is detected in step 101, a traffic value is obtained from a code segment corresponding to the page.

A fourth possible implementation manner is as follows. Traffic statistics collection is implemented at a bottom layer, and correspondingly, step 102 and step 104 of displaying the traffic value in an input box of a to-be-sent screen are also implemented at the bottom layer. Optionally, in another possible implementation manner, in step 102, the traffic value is inserted into the input box of the to-be-sent screen, which is invisible to the user.

When the traffic value for loading the object is obtained in the foregoing described manner or another manner, the traffic value is displayed in the input box of the to-be-sent screen.

Figure 2A:
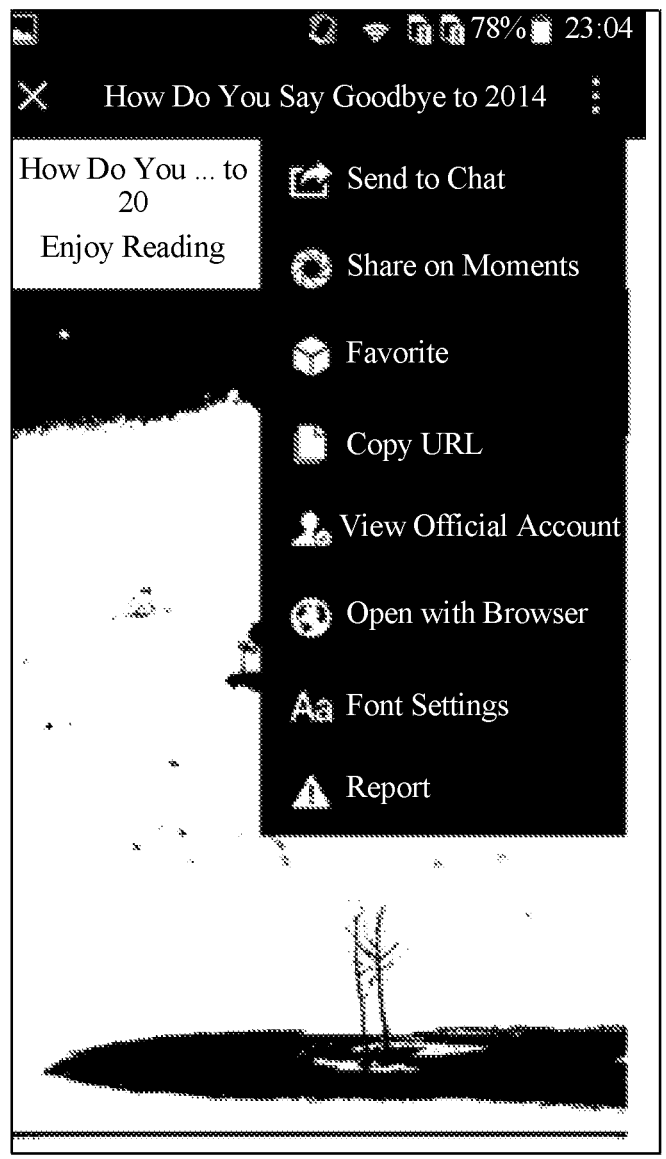
FIG. 2a is a schematic diagram of a process of traffic reminding according to an embodiment of this application.
Figure 2B:
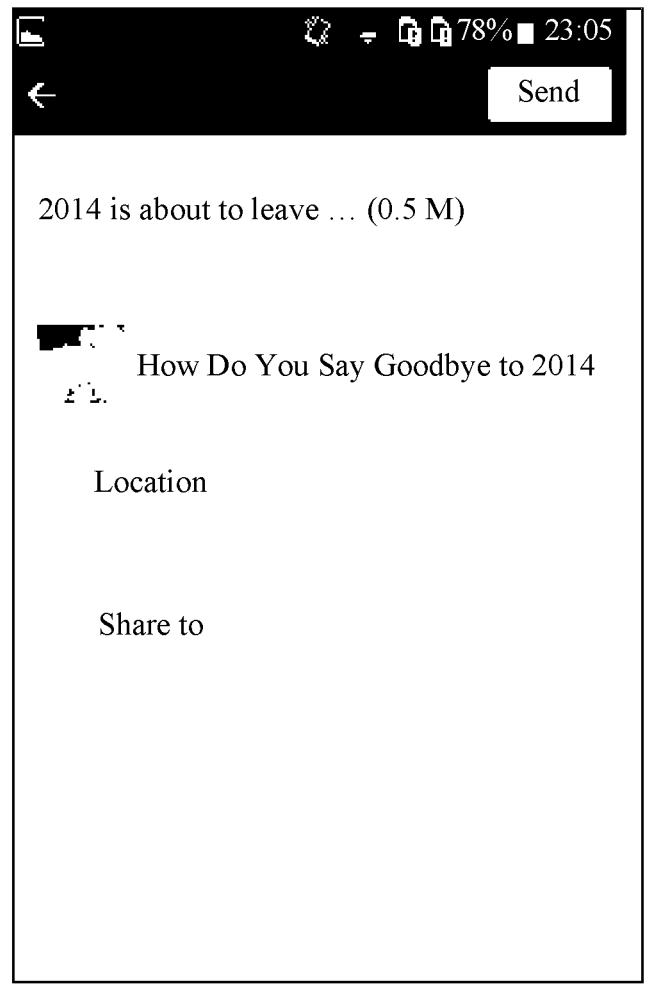
FIG. 2b is a schematic diagram of a process of traffic reminding according to an embodiment of this application.

For example, referring to FIG. 2*a*, after the user reads a page with a title of "How Do You Say Goodbye to 2014", the user considers that the article is good, wants to share it with a circle of friends, and clicks the "more" button. Then, the display of the portable electronic device displays the operation screen shown in FIG. 2*a*. Further, when the user clicks an operation item "Share with a circle of friends", steps 101 and 102 are performed. When steps 101 and 102 are performed, the display of the portable electronic device displays the to-be-sent screen shown in FIG. 2*b*. The to-be-sent screen explicitly displays a traffic value (0.5 M), and in this case, the traffic value is visible to the user. Certainly, in practical application, the to-be-sent screen may implicitly display the traffic value, and in this case, the traffic value is invisible to the user.

Optionally, the user may further perform editing in the input box of the to-be-sent screen, for example, the user may write a reaction to the article, or may delete the traffic value.

Next, when the user clicks a "send" button, the portable electronic device detects the second operation, where the second operation is used to determine to send the object and the information that includes at least the traffic value. Further, in addition to the traffic value, the information that includes at least the traffic value includes information entered by the user in the input box. In response to the second operation, step 104 of sending the object and the information that includes at least the traffic value is performed.

A display area that is formed after step 104 is performed displays thumbnail information of the object and the traffic value. The thumbnail information changes from object to object. For example, when the object is a page that contains a link, the thumbnail information may be an address link of the page. If the object is a picture, the thumbnail information is a thumbnail of the picture. If the object is a local video, the thumbnail information is, for example, the first frame of image of the local video.

The display area displays the traffic value. The display area may explicitly display the traffic value, and the user can intuitively see the traffic value. In practical application, the display area includes the traffic value, or a code segment corresponding to the display area includes the traffic value that is not explicitly displayed in the display area. For example, as described in the foregoing fourth case, in step 102, the third-party application sends the obtained traffic value in a code form, which is invisible to the user. Therefore, after the traffic value is sent by performing step 104, a receiver cannot directly see the traffic value in the display area, but a portable electronic device of the receiver can obtain the traffic value by detecting the display area. Further, after the traffic value is detected, the traffic value may be presented in a visual and/or audible manner, and in this way, the receiver can know the traffic value for loading the object.

Figure 2C:
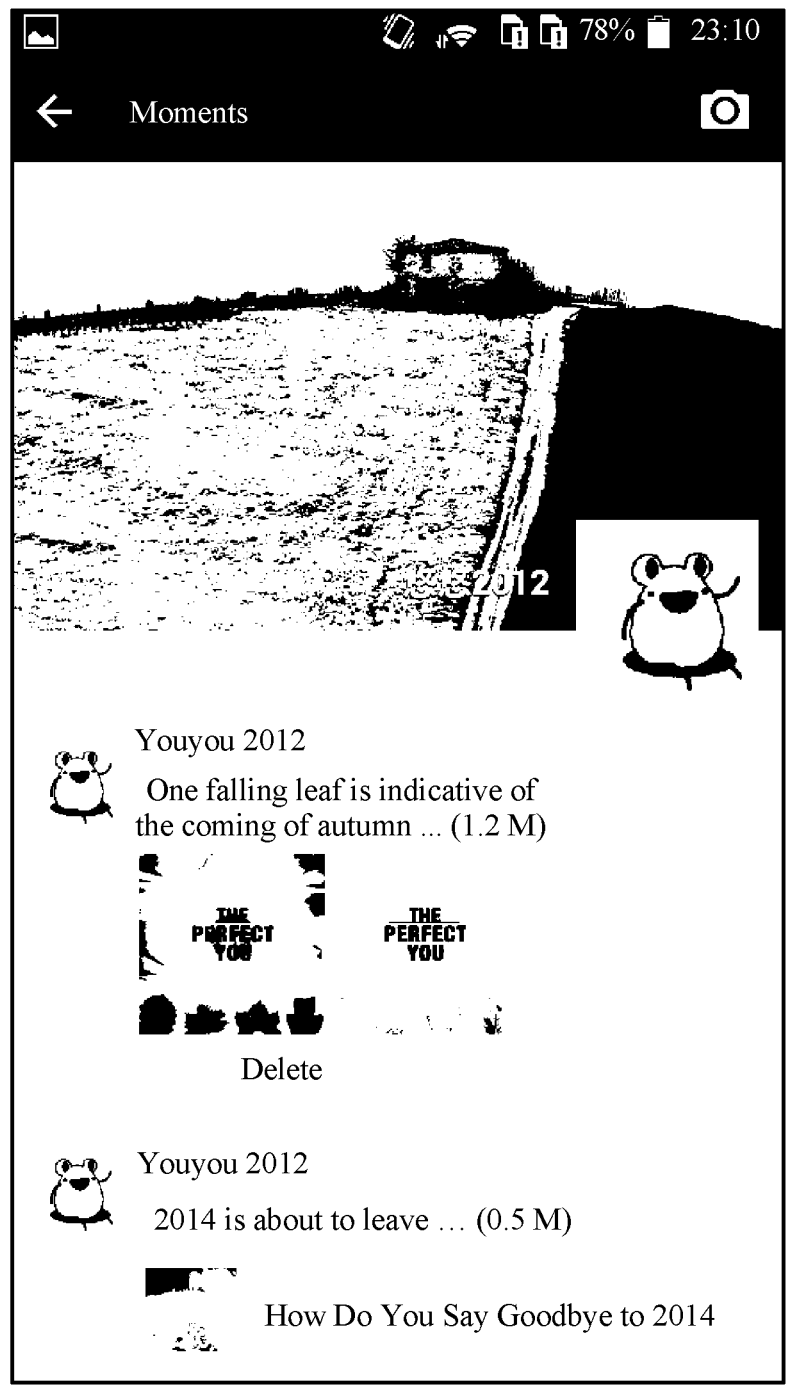
FIG. 2c is a schematic diagram of a process of traffic reminding according to an embodiment of this application.

For example, the screen of Moments is shown in FIG. 2*c* after step 104 is performed.

Therefore, when the traffic value appears in Moments or Weibo of another user, the another user can directly see the traffic value, and can determine whether to open the page, thereby avoiding overusing traffic and resultant additional traffic charges.

It can be learned that, compared with an approach in which whether to open a link can be determined only after a network device pre-computes and delivers data traffic of a web page; by comparison, in the operation processing method in this embodiment of the present disclosure, a receiver can still obtain a traffic reminder even without the help of the network device.

Further, in the method of this embodiment of this application, intervention of the network device is avoided. Therefore, the network device can omit this part of work, thereby reducing a data processing amount.

Further, the traffic value may be directly displayed in the display area. The user can see the traffic value when seeing the object; therefore, a delay caused because the user waits the network device to feed back data traffic of the web page is avoided. Therefore, the operation processing method in this embodiment of the present disclosure is more convenient.

Optionally, after the traffic value is sent in step 104, or when the user cancels sending the traffic value after step 102, the stored traffic value may be deleted to save storage space.

Two specific examples are used to describe the implementation process of the operation processing method in this embodiment of the present disclosure in the following.

Figure 3:
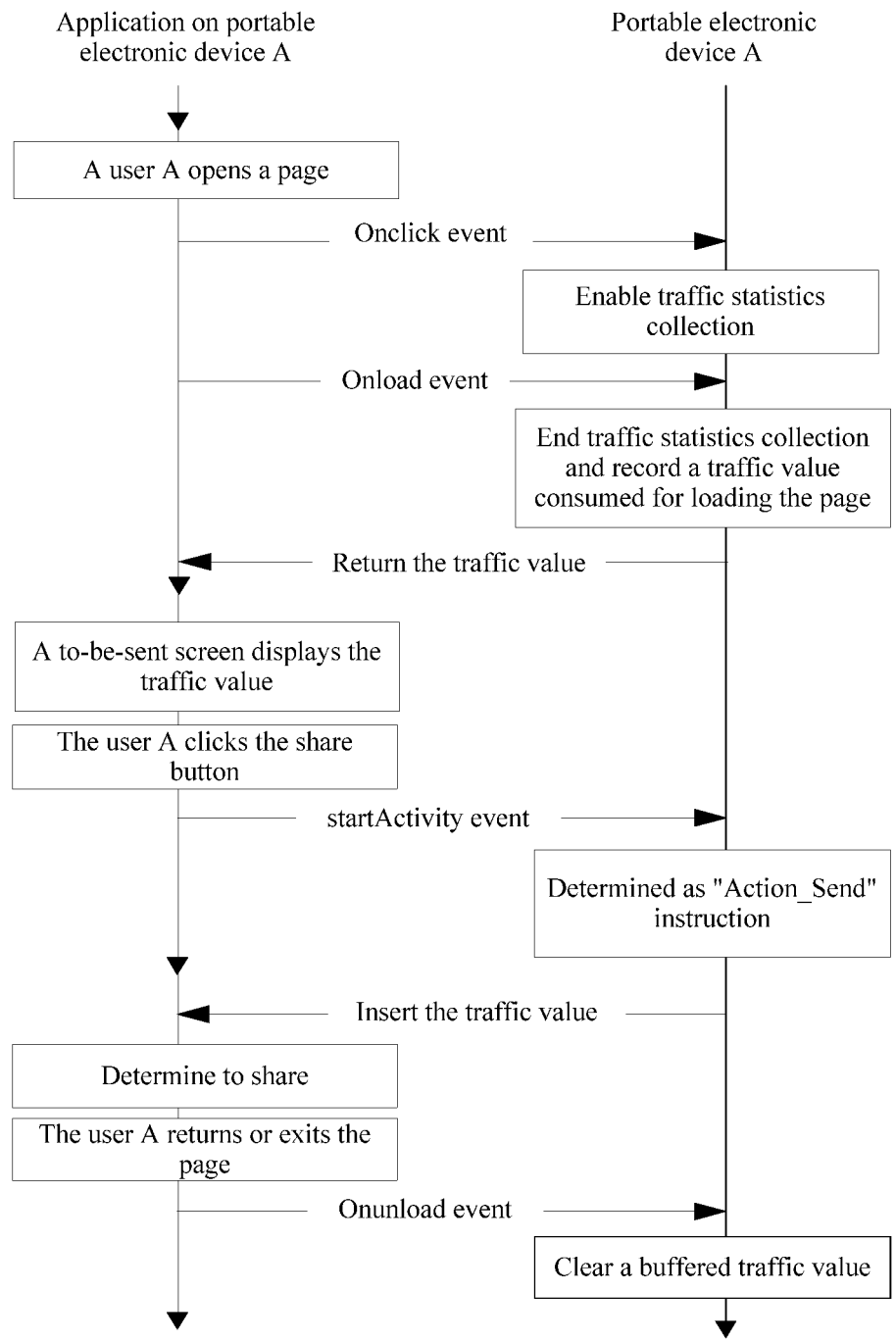
FIG. 3 is a schematic flowchart of traffic reminding according to an embodiment of this application.

The first example is described from a perspective of a sender, and the object is a page that contains a link, an online audio, or an online video. As shown in FIG. 3, when user A opens an address link by clicking an address link or pressing the enter key on portable electronic device A, an onclick event is triggered, and portable electronic device A corresponding to user A enables traffic statistics collection. Portable electronic device A triggers an onload event when the page is completely loaded, and records a traffic value consumed by the URL. Portable electronic device A may buffer the traffic value and reminds user A of the traffic value, to notify user A of the traffic value used for loading the page.

If user A does not send the page after reading the page, but directly exits the page, an onunload event may be triggered, and portable electronic device A clears the buffered traffic value.

When user A clicks a send button on portable electronic device A, a startActivity event is triggered, portable electronic device A determines whether it is an "Action Send" instruction, and if yes, it indicates a send operation (for example, send to Moments). Portable electronic device A obtains a traffic value collected before, and displays the traffic value in an input box of a to-be-sent screen. When user A clicks a determine to send button on portable electronic device A, the traffic value and a link of the page are posted with a circle of friends of user A.

Next, when user A clicks a back key or an exit key on portable electronic device A, an onunload event is triggered, and portable electronic device A clears the buffered traffic value.

Figure 4:
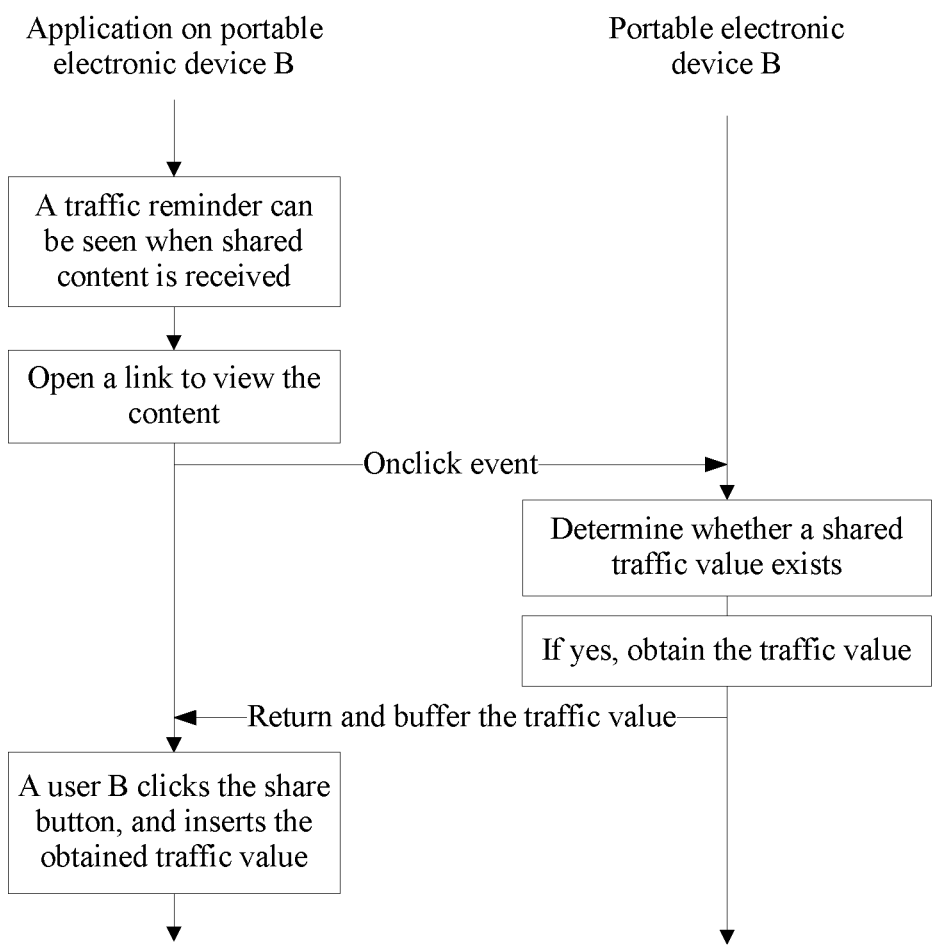
FIG. 4 is another schematic flowchart of traffic reminding according to an embodiment of this application.

The second example is described from a perspective of a receiver. As shown in FIG. 4, user B can see a traffic reminder when receiving a sent link by using portable electronic device B. When user B views content after opening the link, portable electronic device B corresponding to user B determines whether portable electronic device A has sent the traffic value at the same time, and if yes, obtains and buffers the traffic value. When portable electronic device B further sends the traffic value, a sending process is similar to that described in the foregoing first example, and details are not described herein.

The third example is also described from a perspective of a receiver. However, what is different from the second example is that in this example, whether another portable electronic device has sent the traffic value is not determined, but the process described in the first example is directly performed. Therefore, details are not described herein.

Figure 5:
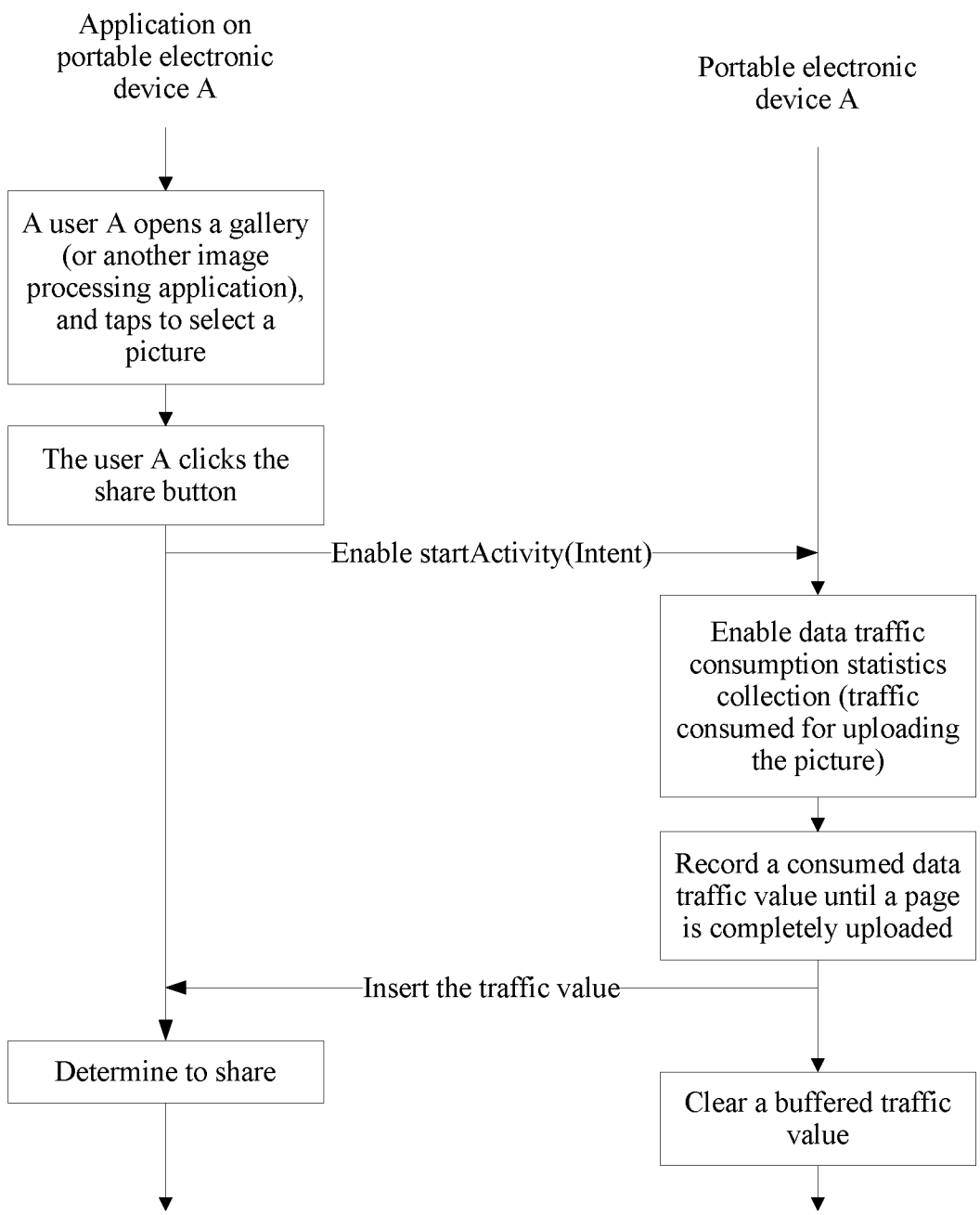
FIG. 5 is still another schematic flowchart of traffic reminding according to an embodiment of this application.

The fourth example is described from a perspective of a sender, and the object is a picture. As shown in FIG. 5, user A clicks and selects a picture in a gallery of portable electronic device A or on an screen of another image processing application, and clicks the send button after finishing clicking and selecting. In this case, a startActivity event is enabled, and portable electronic device A enables data traffic consumption collection, which mainly counts traffic consumed by image uploading. Portable electronic device A records the consumed data traffic value until the page is completely uploaded. Then portable electronic device A displays the traffic value in the input box of the to-be-sent screen. Portable electronic device A sends the image and the traffic value after user A determines to send the image and the traffic value. The buffered traffic data value is cleared after the sending is completed.

After seeing the sent picture, the receiver user B uses a processing manner same as that of the second example and the third example, and details are not described herein.

A sending process of the local music, the local video, and the local dynamic picture is similar to that of the picture in the fourth example. Therefore, details are not described herein.

Figure 6:
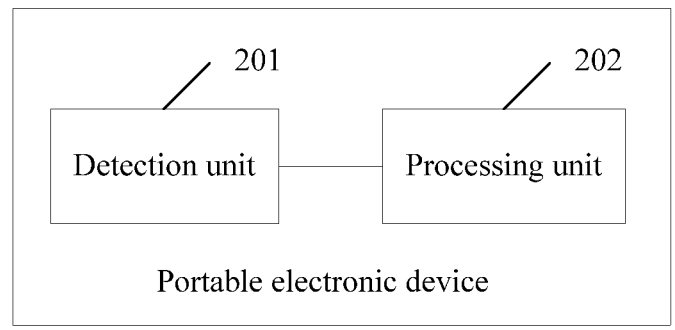
FIG. 6 is a functional block diagram of a portable electronic device according to an embodiment of this application.

Based on a same inventive concept, and referring to FIG. 6, FIG. 6 is a functional block diagram of a portable electronic device according to an embodiment of this application, where the portable electronic device is used to implement the operation processing method shown in FIG. 1 to FIG. 5 of the present disclosure. For the meaning of terms involved in this embodiment, refer to content described in the foregoing embodiment. The portable electronic device includes a detection unit 201 configured to detect a first operation, where the first operation is used to trigger sending an object on an application program, and the object includes a video file, an audio file, a picture, or a page that contains a link; and a processing unit 202 configured to in response to the first operation, determine a traffic value for loading the object, and display the traffic value in an input box of a to-be-sent screen, where the detection unit 201 is further configured to detect a second operation, where the second operation is used to determine to send the object and information that includes at least the traffic value, and the processing unit 202 is further configured to in response to the second operation, send the object and the information that includes at least the traffic value.

Optionally, the processing unit 202 is further configured to before the detection unit 201 detects the first operation, obtain and store a traffic value used for loading the object.

Optionally, the processing unit 202 is further configured to enable traffic statistics collection when the object is opened; when the object is completely loaded, end traffic statistics collection and obtain the used traffic value; and store the obtained traffic value.

Optionally, the processing unit 202 is further configured to before enabling traffic statistics collection, determine that the object is sent by another portable electronic device; and determine that when sending the object, the another portable electronic device does not send the traffic value for loading the object.

Optionally, the processing unit 202 is further configured to determine that the object is sent by another portable electronic device; determine that when sending the object, the another portable electronic device sends the traffic value for loading the object; obtain the traffic value sent by the another portable electronic device, and use the obtained traffic value as the traffic value used for loading the object; and store the traffic value.

Further, the processing unit 202 is further configured to detect whether a display area of the object includes a traffic unit; if the display area of the object includes a traffic unit, determine that the another portable electronic device has sent the traffic value for loading the object; and obtain the traffic unit and a numeric string preceding the traffic unit, and use the traffic unit and the numeric string as the traffic value used for loading the object.

With reference to the foregoing embodiment, the processing unit 202 is further configured to when the object is one of a picture, an audio file, or a video file, obtain a traffic value consumed for uploading the object to the to-be-sent screen, and use the traffic value as the traffic value for loading the object.

With reference to the foregoing embodiment, the processing unit 202 is further configured to when the object is a page that contains a link, and a code segment of the page includes a traffic value, obtain the traffic value in the code segment of the page, and use the traffic value as the traffic value for loading the page.

Various types of variations and specific instances in the operation processing method in the foregoing embodiment in FIG. 1 to FIG. 5 are also applicable to the portable electronic device in this embodiment. With the foregoing detailed descriptions of the operation processing method, a person of ordinary skill in the art can clearly know an implementation method of the portable electronic device in this embodiment. Therefore, for brevity of the specification, details are not described herein.

Figure 7:
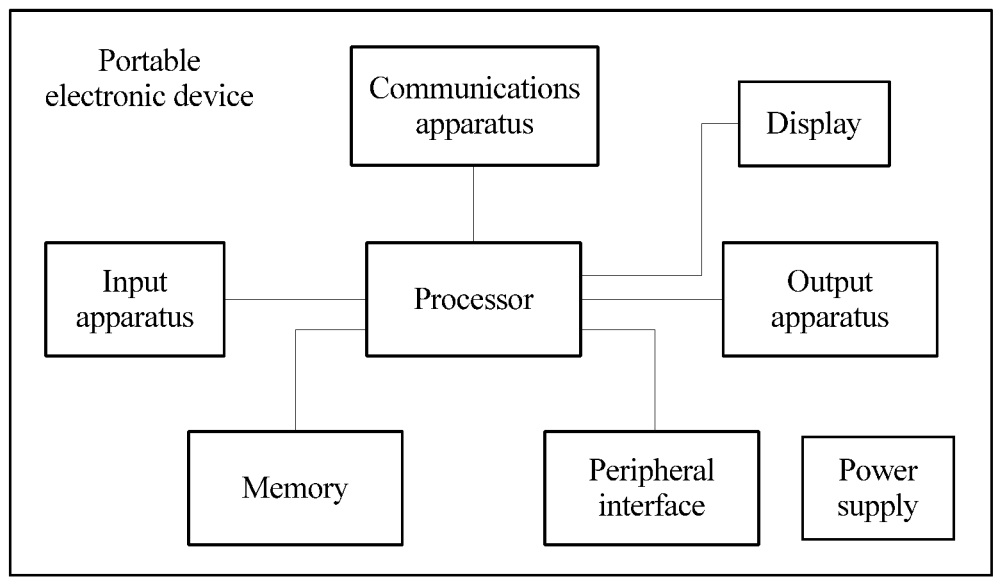
FIG. 7 is a structural block diagram of a portable electronic device according to an embodiment of this application.

Based on a same inventive concept, and referring to FIG. 7, FIG. 7 is a structural block diagram of a portable electronic device according to an embodiment of this application, where the portable electronic device is used to implement the operation processing method shown in FIG. 1 to FIG. 5. For the meaning of terms involved in this embodiment, refer to content described in the foregoing embodiment. The portable electronic device includes components such as a display, an input apparatus, one or more processors, an output apparatus, a communications apparatus, a memory, and a peripheral screen. These components communicate with each other by using one or more buses. A person skilled in the art may understand that a structure of the portable electronic device shown in the figure does not constitute a limitation on the present disclosure. The structure may be a bus structure or a star structure, or may further include more or fewer components than those shown in the figure, or combine some parts, or have different parts arrangements. In this embodiment of the present disclosure, the portable electronic device may be any mobile or portable electronic device, and includes but is not limited to a mobile phone, a mobile computer, a tablet computer, a personal digital assistant (PDA), and a combination of foregoing two or more items.

Further, at least one application program may be installed in the portable electronic device, such as Weibo, WeChat, and Twitter.

The input apparatus is configured to implement interaction between a user and the portable electronic device and/or information input to the portable electronic device. For example, the input apparatus may receive digit or character information entered by the user, to generate signal input related to user setting or function control. In a specific implementation manner of the present disclosure, the input apparatus may be a touch panel, or may be another human-machine interaction screen such as a substantive input key or a microphone, or may be another apparatus for obtaining external information such as a camera. The touch panel, which is also referred to as a touchscreen or a touchscreen, can collect an operation action of touching or approaching performed by the user on the touch panel, for example, an operation action performed by the user on the touch panel or at a position close to the touch panel by using any proper object or accessory such as a finger or a stylus, and a corresponding connecting apparatus is driven according to a preset program. Optionally, the touch panel may include two parts, a touch detection apparatus and a touch controller. The touch detection apparatus detects a touch operation of a user, converts the detected touch operation into an electrical signal, and transmits the electrical signal to the touch controller. The touch controller receives the electrical signal from the touch detection apparatus, converts the electrical signal into contact coordinates, and then sends the contact coordinates to the processing unit. The touch controller may further receive and execute a command sent by the processor. In addition, the touch panel may be implemented by using multiple types such as a resistive type, a capacitive type, an infrared, and a surface acoustic wave. In another implementation manner of the present disclosure, the substantive input key used by the input apparatus may include but is not limited to one or more of a physical keyboard, a function key (such as a volume control key or an on/off key), a trackball, a mouse, an operating lever, or the like. The input apparatus in a form of a microphone may collect voice input by the user or an environment, and convert the voice into a command that is in a form of an electrical signal and can be executed by the processor.

The one or more processors are control centers of the portable electronic device and connect various parts of the entire portable electronic device by using various screens and lines, and implement various functions of the portable electronic device and/or process data by running or executing a software program and/or module and invoking data stored in the memory. The processor may include an integrated circuit (IC), for example, may include a single encapsulated IC, or may include multiple encapsulated ICs that have a same function or different functions. For example, the processor may include only a central processing unit (CPU), or may be a combination of a graphics processing unit (GPU), a digital signal processor (DSP), and a control chip (for example, a baseband chip) in the communications apparatus.

The communications apparatus is configured to establish a communication channel, so that the portable electronic device connects to a remote server through the communication channel, and downloads media data from the remote server. The communications apparatus may include a communications module, such as a wireless local area network (WLAN) module, a Bluetooth module, and a base band module, and a radio frequency (RF) circuit corresponding to the communications module, which are configured to perform wireless local area network communication, Bluetooth communication, infrared ray communication and/or cellular communications system communication, such as Wideband Code Division Multiple Access (WCDMA) and/or High Speed Download Packet Access (HSDPA). The communications apparatus is configured to control communication of all the components in the portable electronic device, and may support direct memory access.

In a different implementation manner of the present disclosure, communications modules in the communications apparatus generally appear in a form of an IC chip and the communications apparatus may be combined selectively without a need of including all communications modules and corresponding antenna groups. For example, the communications apparatus may include only a baseband chip, a radio frequency chip, and a corresponding antenna, to provide a communication function in a cellular communications system. By means of a wireless communications connection established by the communications apparatus, such as wireless local network access or WCDMA access, the portable electronic device can connect to a cellular network or the Internet. In some optional implementation manners of the present disclosure, the communications module in the communications apparatus, for example, the baseband module may be integrated into the processor.

The output apparatus includes but is not limited to an image output unit and a voice output unit. The image output unit is configured to output a text, a picture, and/or a video. The image output unit may include a display panel. The image output unit may include a reflective display, for example, an electrophoretic display, or a display using an interferometric modulation of light technology. In a specific implementation manner of the present disclosure, the touch panel used in the foregoing input apparatus may also be used as the display panel of the output apparatus simultaneously. For example, after detecting a gesture operation of touching or approaching on the touch panel, the touch panel transmits the gesture operation to the processor to determine a type of a touch event, and then the processor provides corresponding visual output on the display panel according to the type of the touch event. In FIG. 7, the input apparatus and the output apparatus serve as two independent parts to implement input and output functions of the portable electronic device; however, in some embodiments, the touch panel and the display panel may be integrated to implement the input and output functions of the portable electronic device. For example, the image output unit may display various graphical user interfaces (GUI) as virtual control components, including but not limited to a window, a scroll bar, an icon, and a clipboard, so that the user performs an operation in a touch manner.

The memory may be configured to store a software program and a module, and the processor executes various functional applications of the portable electronic device and implements data processing by running the software program and the module that are stored in the memory. The memory mainly includes a program storage area and a data storage area, where the program storage area may store an operating system, and an application program by at least one function. The data storage area may store data (such as audio data and an address book) created according to usage of the portable electronic device and the like. In a specific implementation manner of the present disclosure, the storage unit may include a volatile memory, such as a non-volatile random access memory (NVRAM), a phase change random access memory (PRAM), or a magnetoresistive random access memory (MRAM), and may further include a non-volatile memory, such as at least one magnetic disk storage device, an electrically erasable programmable read-only memory (EEPROM), or a flash memory device, such as an NOR flash memory or an NAND flash memory. The operating system includes various components and/or drivers that are configured to control and manage regular system tasks such as memory management, storage device control, and power management, and facilitate communication between various software and hardware. In this implementation manner of the present disclosure, the operating system may be the Android system of Google, the iOS system developed by Apple, the Windows operating system developed by Microsoft, or the like; or may be an embedded operating system such as Vxworks.

A power supply is configured to supply power to different parts of the portable electronic device to maintain their running. Generally, the power supply may be a built-in battery, for example, a common lithium-ion battery or an NiMH battery, or may include an external power supply that directly supplies power to the portable electronic device, for example, an AC adapter. In some embodiments of the present disclosure, the power supply may be defined in a wider scope; for example, may further include a power management system, a charging system, a power failure detection circuit, a power converter or inverter, a power status indicator (such as a light emitting diode), and any other components related to power generation, management, and distribution of the portable electronic device.

In this embodiment of the present disclosure, one or more programs are stored in the memory, and are configured to be executed by the one or more processors. The one or more programs include an instruction used for executing the method described in any one of the embodiments of FIG. 1 to FIG. 5.

Various types of variations and specific instances in the operation processing method in the foregoing embodiment in FIG. 1 to FIG. 5 are also applicable to the portable electronic device in this embodiment. With the foregoing detailed descriptions of the operation processing method, a person of ordinary skill in the art can clearly know an implementation method of the portable electronic device in this embodiment. Therefore, for brevity of the specification, details are not described herein.

Based on a same inventive concept, an embodiment of this application further provides a computer readable storage medium configured to store one or more program codes, where the one or more program codes include an instruction, and when executed by a portable electronic device that includes a display and multiple application programs, the instruction enables the portable electronic device to execute the method described in any one of the foregoing embodiments in FIG. 1 to FIG. 5.

In practical application, the readable storage medium may be an optical disk, a magnetic disk, a hard disk, a USB flash drive, or the like.

One or more technical solutions provided in the embodiments of this application have at least the following technical effects or advantages.

In the embodiments of the present disclosure, when an object is being sent, a traffic value for loading the object is obtained, the traffic value is displayed in an input box of a to-be-sent screen, and then the traffic value for loading the object is sent together with the object. It can be learned that, in the embodiments of the present disclosure, the traffic value is sent together with the object, so that when a receiver receives the object, the receiver can also receive the traffic value for loading the object at the same time. Therefore, a user can conveniently know the traffic value for loading the object, and then determine, based on the traffic value, whether to open the object. Compared with an approach in which whether to open a link can be determined only after a network device pre-computes and delivers data traffic of a web page, in the method of the embodiments of the present disclosure, the receiver can still obtain a traffic reminder even without the help of the network device.

Further, in the method of the embodiments of this application, an intervention of the network device is avoided. Therefore, the network device can omit this part of work, thereby reducing a data processing amount.

Further, because the user can see the traffic value when seeing the object, a delay for waiting for a feedback of data traffic of a web page is excluded. Therefore, the operation processing method provided in the embodiments of the present disclosure is more convenient.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An operation processing method applied to a portable electronic device comprising a display and multiple application programs, the operation processing method comprising:
   obtaining and storing a traffic value by:
      determining that an object of one the application programs is from another portable electronic device;
      determining that the another portable electronic device does not send the traffic value;
      enabling traffic statistics collection when the object is opened;
      ending the traffic statistics collection when the object is completely loaded;
      obtaining the traffic value when the object is completely loaded; and
      storing the traffic value;
   detecting a first operation to trigger sending the object of one of the application programs, wherein the object comprises a video file, an audio file, a picture, or a page that contains a link;
   retrieving the traffic value for loading the object in response to the first operation, wherein the traffic value is determined based in part by the portable electronic device collecting traffic statistics associated with opening the object;
   displaying the traffic value in an input box of a to-be-sent screen;
   detecting a second operation to send the object and information comprising the traffic value; and
   sending the object and the information in response to the second operation.

2. The operation processing method of claim 1, wherein when the object is one of the picture, the audio file, or the video file, determining the traffic value comprises:
   obtaining a consumed traffic value consumed while uploading the object to the to-be-sent screen; and
   using the consumed traffic value as the traffic value.

3. The operation processing method of claim 1, wherein when the object is the page that contains the link, and a code segment of the page comprises the traffic value, determining the traffic value comprises obtaining the traffic value from the code segment of the page.

4. A portable electronic device comprising:
   a memory configured to store at least one application program; and
   one or more processors coupled to the memory and configured to:
      obtain and store a traffic value by:
         determining that an object of one the at least one application program is from another portable electronic device;
         determining that the another portable electronic device does not send the traffic value;
         enabling traffic statistics collection when the object is opened;
         ending the traffic statistics collection when the object is completely loaded;
         obtaining the traffic value when the object is completely loaded; and
         storing the traffic value;
      detect a first operation to trigger sending the object of the at least one application program, wherein the object comprises a video file, an audio file, a picture, or a page that contains a link;
      retrieving the traffic value for loading the object in response to the first operation, wherein the traffic value is determined based in part by the portable electronic device collecting traffic statistics associated with opening the object;
      display the traffic value in an input box of a to-be-sent screen;
      detect a second operation to send the object and information comprising the traffic value; and
      send the object and the information in response to the second operation.

5. The portable electronic device of claim 4, wherein when the object is one of the picture, the audio file, or the video file, the one or more processors is configured to determine the traffic value comprises the one or more processors being configured to:
   obtain a consumed traffic value consumed while uploading the object to the to-be-sent screen; and
   use the consumed traffic value as the traffic value.

6. The portable electronic device of claim 4, wherein when the object is the page that contains the link, and a code segment of the page comprises the traffic value, the one or more processors is configured to determine the traffic value comprises obtaining the traffic value from the code segment of the page.

7. A non-transitory computer readable storage medium storing instructions that when executed by one or more processors of a portable electronic device cause the portable electronic device to:
   obtain and store a traffic value by:
      determining that an object of at least one application program is from another portable electronic device;
      determining that the another portable electronic device does not send the traffic value;
      enabling traffic statistics collection when the object is opened;
      ending the traffic statistics collection when the object is completely loaded;
      obtaining the traffic value when the object is completely loaded; and
      storing the traffic value;
   detect a first operation to trigger sending the object of the at least one application program, wherein the object comprises a video file, an audio file, a picture, or a page that contains a link;
   retrieve the traffic value for loading the object in response to the first operation, wherein the traffic value is determined based in part by the portable electronic device collecting traffic statistics associated with opening the object;
   display the traffic value in an input box of a to-be-sent screen;
   detect a second operation to send the object and information comprising the traffic value; and
   send the object and the information in response to the second operation.

* * * * *